US012808507B2

(12) United States Patent
Dreßler

(10) Patent No.: US 12,808,507 B2
(45) Date of Patent: Nov. 24, 2026

(54) PROJECTION MODULE FOR A HEADLAMP IN A MOTOR VEHICLE

(71) Applicant: Hella GmbH & Co. KGaA, Lippstadt (DE)

(72) Inventor: Björn Dreßler, Menden (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/007,970

(22) Filed: Jan. 2, 2025

(65) Prior Publication Data

US 2025/0224090 A1 Jul. 10, 2025

(30) Foreign Application Priority Data

Jan. 4, 2024 (DE) ........................ 102024100173.9

(51) Int. Cl.
*F21S 41/265* (2018.01)
*F21S 41/143* (2018.01)
(Continued)

(52) U.S. Cl.
CPC ........... *F21S 41/265* (2018.01); *F21S 41/143* (2018.01); *F21S 41/24* (2018.01); *F21W 2102/13* (2018.01)

(58) Field of Classification Search
CPC ........ F21S 41/265; F21S 41/24; F21S 41/255; F21S 41/285; F21S 41/322; F21S 41/25; F21S 41/143; F21S 41/147; F21S 41/151; F21S 41/153; F21S 41/663; F21S 41/141; F21V 5/04; F21V 19/001; F21W 2102/13;
(Continued)

(56) References Cited

U.S. PATENT DOCUMENTS 8,931,939 B2 * 1/2015 Melzner .................... F21V 5/04 362/531
2013/0201712 A1 * 8/2013 Fadel ...................... F21S 41/40 362/516
2022/0136673 A1 * 5/2022 Dressler ................ F21S 41/657 362/516

FOREIGN PATENT DOCUMENTS

CN 114127926 A * 3/2022 ......... H10H 20/8514
DE 102011085378 A1 5/2013
(Continued)

OTHER PUBLICATIONS

Search English translation of WO 2013024159 A2 (Year: 2013).*
Search English translation of CN 114127926 A (Year: 2022).*
Search English translation of WO 2020257505 A1 (Year: 2020).*

*Primary Examiner* — Omar Rojas Cadima
(74) *Attorney, Agent, or Firm* — Husch Blackwell LLP

(57) ABSTRACT

A projection module for a motor vehicle headlamp has a first light source with a light-emitting diode to emit light for generating a first light distribution. A second light source has a light-emitting diode emits light for generating a second light distribution. Primary optics contain first and second optical waveguides. The first optical waveguide has at least one light-entry surface for the light from the at least one first light source, and at least one light-emitting surface. The second optical waveguide has at least one light-entry surface for the light from the at least one second light source, and at least one light-emitting surface. Light exiting the light-emitting surfaces of the primary optics passes through secondary optics when the projection module is in use. One or more of the light-emitting diodes in the light sources are designed to emit light with a luminance of more than 400 $cd/mm^2$.

17 Claims, 1 Drawing Sheet

(51) Int. Cl.
*F21S 41/24* (2018.01)
*F21W 102/13* (2018.01)

(58) Field of Classification Search
CPC ........... F21W 2102/20; F21W 2107/10; F21Y 2113/00; F21Y 2115/10
See application file for complete search history.

(56) References Cited

FOREIGN PATENT DOCUMENTS

| | | | | | |
|---|---|---|---|---|---|
| DE | 102019118968 | A1 | | 1/2021 | |
| WO | WO-2013024159 | A2 | * | 2/2013 | ............. B60Q 1/007 |
| WO | WO-2020257505 | A1 | * | 12/2020 | ......... H01S 5/34333 |

* cited by examiner

Fig. 1
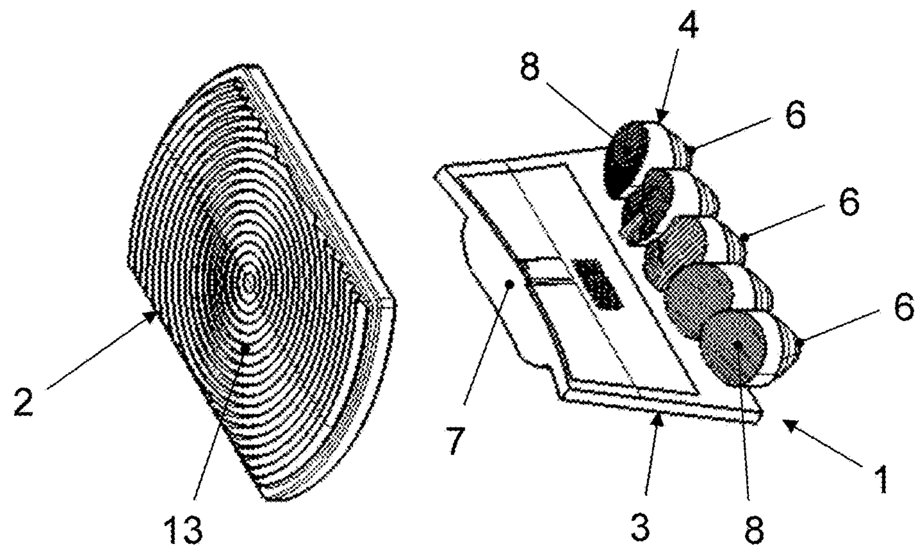
Fig. 2
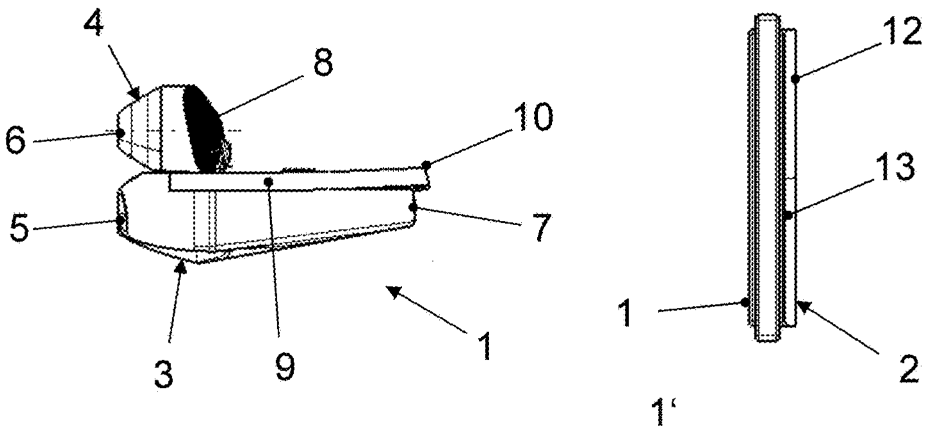
Fig. 3
Fig. 4
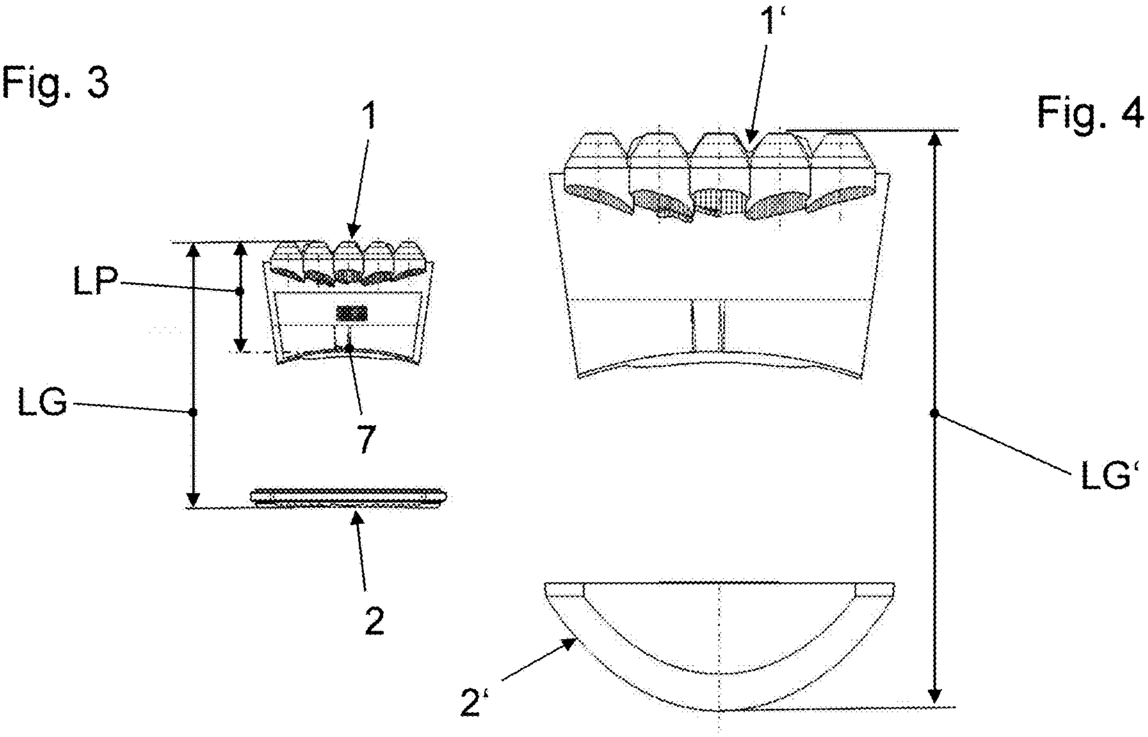

PROJECTION MODULE FOR A HEADLAMP IN A MOTOR VEHICLE

CROSS REFERENCE

This application claims priority to German Application No. 10 2024 100173.9, filed Jan. 4, 2024, the entirety of which is hereby incorporated by reference.

FIELD OF THE INVENTION

The present invention relates to a projection module for a headlamp in a motor vehicle.

BACKGROUND OF THE INVENTION

A projection module of this type is disclosed in DE 10 2019 118 968 A1. The projection module described therein contains numerous first light sources and numerous second light sources, as well as primary optics with first and second optical waveguides. The light from the first light sources generates a first light distribution and the light from the second light sources generates a second light distribution. The first can be a high beam light distribution, and the second can be a low beam light distribution. The first optical waveguide prefocuses the light from the first light sources, and the second optical waveguide prefocuses the light from the second light sources. The projection module also contains secondary optics for focusing the light exiting the primary optics in front of the motor vehicle.

Styling and design play an extremely important role for automobile headlamps, and manufacturers use these components to affect the appearance of the vehicle and its recognition value. The current trend is toward small, unobtrusive main lighting functions. At the same time, the importance of ratings, i.e. qualitative and quantitative evaluations, has increased. The appearance of clear light/dark boundaries, high intensities near the light/dark boundaries, and homogenous light distributions are essential. The projection module disclosed in DE 10 2019 118 968 A1 offers this. Because of the necessary size of the lens forming the secondary optics and the light distribution optics, these projection modules have increasingly smaller installation spaces in modern headlamps. Prior concepts for these projection modules require a comparatively thick aspherical lens as the secondary optics. Furthermore, the typical appearance of such a lens does not satisfy the styling requirements for a modern headlamp in which the main lighting functions are less important than the appearance of the signal lights. The headlamps contain more components, reducing the available space for the main lighting functions.

BRIEF SUMMARY OF THE INVENTION

The fundamental problem addressed by the present invention is to create a projection module of the above type that is more compact, which can also generate high intensities near the light/dark boundary, and has an appearance that is aligned with current styling preferences.

One or more, or all, of the light-emitting diodes in the light sources are designed to emit light with a luminance of more than 400 cd/mm$^2$. These light-emitting diodes can be designed to emit light with a luminance of more than 420 cd/mm$^2$, in particular between 430 cd/mm$^2$ and 450 cd/mm$^2$, e.g. light with a luminance of approx. 440 cd/mm$^2$. They emit light with a luminance that is significantly greater than those used in the projection module disclosed in DE 10 2019 118 968 A1. Because of the higher luminance, the primary optics do not have to be as large. This also results in higher intensities near the light/dark boundaries.

One or more, or all, of the light-emitting diodes in the light sources can be designed to emit light with a luminous flux of 200 lm to 300 lm, in particular with a luminous flux of 225 lm to 275 lm, e.g. approx. 250 lm. Furthermore, these light-emitting diodes can have an active light-emitting surface that is between 0.40 mm$^2$ and 0.70 mm$^2$, in particular between 0.50 mm$^2$ and 0.60 mm$^2$, e.g. approx. 0.56 mm$^2$. These light-emitting diodes can be high-luminance light-emitting diodes (LEDs).

The length of the primary optics from the at least one light-entry surface on the first optical waveguide to the at least one light-emitting surface thereon can be between 17 mm and 30 mm, in particular between 20 mm and 27 mm, preferably approx. 23.5 mm. Typical primary optics, such as those described in DE 10 2019 118 968 A1, are approx. 47 mm. Furthermore, the size of the primary optics can be between 3 cm$^3$ and 7 cm$^3$, in particular between 4 cm$^3$ and 6 cm$^3$, preferably 5 cm$^3$. Typical primary optics such as those described in DE 10 2019 118 968 A1 are approx. 34 cm$^3$. The primary optics in the projection module obtained with the invention are therefore substantially more compact that those in the prior art, thus requiring less installation space. In particular, the primary optics can comprise or be a monolithic optical component that contains both the first and second optical waveguides.

The secondary optics can comprise or be a projection lens with a light-entry surface for the light exiting the primary optics and a light-emitting surface for the light entering the light-entry surface. This projection lens can be a Fresnel lens with at least one Fresnel structure on the light-entry and/or light-emitting surface. Because of the Fresnel structure, the secondary optics can be substantially more compact than those in the projection module from the prior art. This Fresnel structure also gives the secondary optics a modern appearance.

The length of the optics for the projection module formed by the primary and secondary optics from light-entry surfaces of the primary optics to the light-emitting surface of the secondary optics is between 40 mm and 70 mm, in particular between 50 mm and 60 mm, preferably approx. 56 mm. Typical optics like those described in DE 10 2019 118 968 A1 are approx. 112 mm long. The compact size of the primary and secondary optics thus contributes to significantly reducing the necessary installation space in comparison with the prior art.

The first light distribution can be a high beam light distribution, or a part thereof, and/or the second light distribution can be a low beam light distribution, or a part thereof.

The projection module can contain more than one first light source and/or more than one second light source. The first optical waveguide can also have more than one light-entry surface and/or the second optical waveguide can contain more than one light-entry surface.

Each of the first light sources can have a dedicated light-entry surface on the first optical waveguide, such that the light from the first light sources enters the first optical waveguide through the dedicated light-entry surface thereon, and/or each of the second light sources can have a dedicated light-entry surface on the second optical waveguide, such that light from the second light sources enters the second optical waveguide through the dedicated light-entry surface thereon.

The first optical waveguide can have a single light-emitting surface for the light entering it through the numerous light-entry surfaces, and/or the second optical waveguide can have numerous separate light-emitting surfaces dedicated to separate light-entry surfaces, such that the light entering these light-entry surfaces exits the second optical waveguide through the dedicated light-emitting surfaces.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a perspective view of part of a projection module obtained with the invention.

FIG. 2 shows a side view of the part of the projection module shown in FIG. 1.

FIG. 3 shows the part of the projection module shown in FIG. 1 from above.

FIG. 4 shows part of a projection module according to the prior art from above.

DETAILED DESCRIPTION OF THE DRAWINGS

Identical and functionally identical parts have the same reference symbols in the drawings.

The embodiment of a projection module obtained with the invention shown in FIGS. 1 to 3 contains numerous first and second light sources, not shown, primary optics 1 and secondary optics 2.

The first and second light sources each contain at least one light-emitting diode (LED). One or more, preferably all, of the light-emitting diodes in the light sources are designed to emit light with a luminance of more than 400 cd/mm$^2$, in particular with a luminance of between 430 cd/mm$^2$ and 450 cd/mm$^2$, e.g. approx. 440 cd/mm$^2$. Furthermore, these light-emitting diodes can be designed to emit light with a luminous flux of 200 lm to 300 lm, in particular from 225 lm to 275 lm, e.g. approx. 250 lm. Moreover, one or more, preferably all, of the light-emitting diodes in the light sources can have an active light-emitting surface area of between 0.40 mm$^2$ to 0.70 mm$^2$, in particular 0.50 mm$^2$ to 0.60 mm$^2$, e.g. approx. 0.56 mm$^2$. These light-emitting diodes can be high-luminance light-emitting diodes.

The first light sources are designed to emit light for generating a first light distribution, in particular a high beam light distribution or part thereof. The second light sources are designed to emit light for generating a second light distribution, in particular a low beam light distribution, or part thereof. The first and second light sources can be controlled separately to generate these light distributions.

The primary optics 1 contain a first optical waveguide 3 and second optical waveguide 4. The first optical waveguide 3 and second optical waveguide 4 each have numerous light-entry surfaces 5, 6. The light-entry surfaces 5 on the first optical waveguide 3 are adjacent to one another in a row, and the light-entry surfaces 6 on the second optical waveguide 4 are also adjacent to one another in a row that is parallel to and above the row of light-entry surfaces 5 on the first optical waveguide 3.

Each of the first light sources has a dedicated light-entry surface 5 on the first optical waveguide 3, such that the light from the first light source enters the first optical waveguide 3 through these light-entry surfaces 5. Furthermore, each of the second light sources has a dedicated light-entry surface 6 on the second optical waveguide 4, such that the light from the second light source enters the second optical waveguide 4 through these light-entry surfaces 6.

The first optical waveguide 3 has a single light-emitting surface 7 for the light entering through the numerous light-entry surfaces 5. The second optical waveguide has numerous separate light-emitting surfaces 8, each of which is dedicated to one of the light-entry surfaces 6, such that the light entering through the light-entry surfaces 6 exits the second optical waveguide 4 through these light-emitting surfaces 8.

As shown in particular in FIG. 2, the first optical waveguide 3 is longer than the second optical waveguide 4. There is a shutter 9 above the first optical waveguide 3, the edge 10 of which is on the right. Part of the light exiting the light-emitting surfaces 8 of the second optical waveguide 4 is reflected on the surface of the shutter 9, and the edge 10 of the shutter generates the horizontal light/dark boundary in a low beam light distribution.

The primary optics form a monolithic optical component that contains the first and second optical waveguides 3, 4 and the shutter 9.

The length LP of the primary optics from the light-entry surfaces 5 on the first optical waveguide 3 to the light-emitting surfaces 7 on the first optical waveguide 3 is between 17 mm and 30 mm, in particular 20 mm and 27 mm, preferably approx. 23.5 mm. The size of the primary optics is between 3 cm$^3$ and 7 cm$^3$, in particular 4 cm$^3$ and 6 cm$^3$, preferably approx. 5 cm$^3$.

The secondary optics 2 is a projection lens with which the light for generating the desired light distribution is projected in front of the motor vehicle. This projection lens has a light-entry surface 11 for the light exiting the light-emitting surfaces 7, 8 in the primary optics 1, and a light-emitting surface 12 for the light entering through this light-entry surface 11. This projection lens can be a Fresnel lens that has at least one Fresnel structure 13 (see FIG. 1) on the light-entry surface 11 and/or the light-emitting surface 12 thereof.

The length LG of the optics of the projection module formed by the primary optics 1 and secondary optics 2 from the light-entry surfaces 5, 6 in the primary optics to the light-emitting surface 12 of the secondary optics is between 40 mm and 70 mm, in particular between 50 mm and 60 mm, preferably approx. 56 mm. Typical optics from the prior art, containing primary optics 1' and secondary optics 2', are shown in FIG. 4 to illustrate the differences. The length LG' thereof is approx. 112 mm.

LIST OF REFERENCE SYMBOLS

1 primary optics
1' primary optics in the prior art
2 secondary optics
2' secondary optics in the prior art
3 first optical waveguide
4 second optical waveguide
5 light-entry surface on the first optical waveguide
6 light-entry surface on the second optical waveguide
7 light-emitting surface on the first optical waveguide
8 light-emitting surface on the second optical waveguide
9 shutter
10 edge of the shutter
11 light-entry surface on the secondary optics
12 light-emitting surface on the secondary optics
13 Fresnel structure
LP length of the primary optics
LG length of the optics
LG' length of the optics in the prior art

The invention claimed is:

1. A projection module for a headlamp in a motor vehicle, the projection module comprising:
at least one first light source configured to emit light for generating a first light distribution, wherein the at least one first light source includes at least one light-emitting diode;
at least one second light source configured to emit light for generating a second light distribution, wherein the at least one second light source includes at least one light-emitting diode;
primary optics including:
a first optical waveguide having at least one first light-entry surface for the light from the at least one first light source, and at least one first light-emitting surface;
a second optical waveguide having at least one second light-entry surface for the light from the at least one second light source, and at least one second light-emitting surface; and
a shutter positioned between the first optical waveguide and the second optical waveguide; and
secondary optics through which light exiting the first and second light-emitting surfaces of the primary optics passes when the projection module is in use,
wherein one or more of the light-emitting diodes of the first and second light sources are configured to emit light with a luminance of more than 400 cd/mm$^2$,
wherein the shutter includes a reflective surface positioned to reflect the light from the at least one second light source exiting the second optical waveguide via the at least one second light-emitting surface,
wherein the secondary optics comprise a projection lens having a third light-entry surface for the light exiting the first and second light-emitting surfaces of the primary optics and a third light-emitting surface for the light entering through the third light-entry surface, and
wherein the projection lens is a Fresnel lens.

2. The projection module according to claim 1, wherein one or more of the light-emitting diodes of the first and second light sources emit light with a luminance of more than 420 cd/mm$^2$.

3. The projection module according to claim 2, wherein one or more of the light-emitting diodes of the first and second light sources emit light with a luminance of between 430 cd/mm$^2$ and 450 cd/mm$^2$.

4. The projection module according to claim 1, wherein one or more of the light-emitting diodes of the first and second light sources have an active light-emitting surface, wherein a size of the active light-emitting surface is between 0.40 mm$^2$ and 0.70 mm$^2$.

5. The projection module according to claim 1, wherein a length (LP) of the primary optics from the at least one first light-entry surface on the first optical waveguide to the at least one first light-emitting surface on the first optical waveguide is between 17 mm and 30 mm.

6. The projection module according to claim 1, wherein a size of the primary optics is between 3 cm$^3$ and 7 cm$^3$.

7. The projection module according to claim 1, wherein the primary optics comprise a monolithic optical component, wherein the monolithic optical component includes both the first and second optical waveguides.

8. The projection module according to claim 1, wherein one or more of the light-emitting diodes of the first and second light sources emit light with a luminous flux of 200 lm to 300 lm.

9. The projection module according to claim 1, wherein the projection lens has at least one Fresnel structure on the third light-entry surface and/or the third light-emitting surface.

10. The projection module according to claim 1, wherein the first light distribution is a high beam light distribution or part thereof, and/or the second light distribution is a low beam light distribution or part thereof.

11. The projection module according to claim 1, wherein a length (LG) of the optics in the projection module formed by the primary optics and secondary optics, from the first and second light-entry surfaces of the primary optics to a third light-emitting surface of the secondary optics, is between 40 mm and 70 mm.

12. The projection module according to claim 1, wherein the projection module includes more than one first light source and/or more than one second light source.

13. The projection module according to claim 12, wherein the first optical waveguide has more than one first light-entry surface and/or the second optical waveguide has more than one second light-entry surface.

14. The projection module according to claim 13, wherein each of the first light sources has a dedicated first light-entry surface on the first optical waveguide, such that the light from the first light sources passes through the dedicated first light-entry surfaces on the first optical waveguides, and/or each of the second light sources has a dedicated second light-entry surface on the second optical waveguide, such that the light from the second light sources enters the dedicated second light-entry surfaces on the second optical waveguide.

15. The projection module according to claim 1, wherein the first optical waveguide has a single first light-emitting surface for the light entering through multiple first light-entry surfaces, and/or the second optical waveguide has multiple second light-emitting surfaces, each of which is dedicated to one of the at least one second light-entry surface such that the light entering the at least one second light-entry surface exits the second optical waveguide through the dedicated light-emitting surfaces.

16. The projection module according to claim 1, wherein an outer edge of the shutter is configured to generate a light/dark boundary of the second light distribution.

17. The projection module according to claim 16, wherein:
the first optical waveguide is longer than the second optical waveguide, and
the outer edge of the shutter is positioned proximate the at least one first light-emitting surface of the first optical waveguide.

* * * * *